US007398511B2

(12) United States Patent  (10) Patent No.: US 7,398,511 B2
El-Shimi et al.  (45) Date of Patent: Jul. 8, 2008

(54) SYSTEM AND METHOD FOR PROVIDING A HEALTH MODEL FOR SOFTWARE

(75) Inventors: Ahmed El-Shimi, Seattle, WA (US); Christopher W. Hallum, Redmond, WA (US); Martin Edward Hough, Sammamish, WA (US); Lorenzo Rizzi, Kirkland, WA (US); Anil Kumar Yadav, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 10/734,016

(22) Filed: Dec. 10, 2003

(65) Prior Publication Data

US 2005/0188269 A1   Aug. 25, 2005

(51) Int. Cl.
*G06F 9/44*   (2006.01)
(52) U.S. Cl. .................. 717/104; 717/127; 709/224
(58) Field of Classification Search .................. 714/47; 717/127, 104; 702/182; 709/224
See application file for complete search history.

(56) References Cited

U.S. PATENT DOCUMENTS

| | | | | |
|---|---|---|---|---|
| 6,505,342 B1 * | 1/2003 | Hartmann et al. | ........... | 717/104 |
| 6,966,015 B2 * | 11/2005 | Steinberg et al. | ............... | 714/47 |
| 6,968,291 B1 * | 11/2005 | Desai | .......................... | 702/182 |
| 7,028,228 B1 * | 4/2006 | Lovy et al. | ..................... | 714/57 |
| 2003/0204789 A1 * | 10/2003 | Peebles et al. | ................ | 714/47 |
| 2005/0015668 A1 * | 1/2005 | Doyle et al. | ................... | 714/25 |

OTHER PUBLICATIONS

"The AIX Error Logging Facility", Sandor W. Sklar,Sys Admin the Journal to UNIX Systems Administrators, Jun. 3, 2003.*

* cited by examiner

*Primary Examiner*—Tuan Q. Dam
*Assistant Examiner*—Thuy Dao
(74) *Attorney, Agent, or Firm*—Workman Nydegger (57) ABSTRACT

A health model builder may construct a health model from instrumentation of software. To do so, the instrumentation of the software component may be mapped to states of operation of the software component and the instrumentation may be grouped together. A health model may be built with the states of operation resulting from mapping the instrumentation to states of operation of the software component and with transitions between the states of the health model that represent an occurrence of instrumentation in an instrumentation group. The system allows for identification of anti-alert instrumentation to be added where instrumentation is missing for reporting recovery from failure. Moreover, a blame component may be identified for any instrumentation of a software component that indicates it failed because of another software component.

37 Claims, 7 Drawing Sheets

| Event Group | Event ID | State Before | State After | Anti-alert | Remedy | Blame Component | Description |
|---|---|---|---|---|---|---|---|
| LS8 | 3222339601 | Non-activated | Non-activated | | Ensure defauilt crypto providers | Crypto | Can't save certificate store, error %1!x!. |
| LS4 | 3221291021 | Running | Paused | 3221291019 | | License Server | Terminal Server Licensing was paused. |
| LS9 | 3221291019 | Paused | Running | | | License Server | Terminal Server Licensing was started. |
| LS2 | 3221291020 | Stopped | Running | | | License Server | Terminal Server Licensing was started. |
| LS6 | 3221291028 | Running | Failed | | Ensure right access to TermSrvLicensing reg keys | License Server | Can't access required registry entry, error code %1!x!. |
| LS1 | 3221291029 | Stopped | Failed | | Verify enough memory | Resource crunch | Can't allocate required memory. |
| LS5 | 3355443215 | Running | Running | | Client trying to steal license | TS Client | Policy module for product %1!s!, company %2!s! returned unexpected data, request has been |
| LS7 | 3222339608 | Non-activated | Activated | | Check ACLs on TermServLicensing reg keys | License Server | Unable to backup server's ceritifcate, server might need to be re-registered if primary copy is corrupt. |
| LS3 | 3222274052 | Running | Stopped | | Unable to restore the saved database | License Server | possible corrupted database |
| LS1 | 3222798341 | Stopped | Failed | | ACLs on the registry where Jet tries | License Server | Can't create ESE database file %1!s! - error %2!d! %3!s!. |

| Event Group | Event ID | State Before | State After | Anti-alert | Remedy | Blame Component | Description |
|---|---|---|---|---|---|---|---|
| LS8 | 3222339601 | Non-activated | Non-activated | | Ensure default crypto providers | Crypto | Can't save certificate store, error %1!x!. |
| LS4 | 3221291021 | Running | Paused | 3221291019 | | License Server | Terminal Server Licensing was paused. |
| LS9 | 3221291019 | Paused | Running | | | License Server | Terminal Server Licensing was started. |
| LS2 | 3221291020 | Stopped | Running | | | License Server | Terminal Server Licensing was started. |
| LS6 | 3221291028 | Running | Failed | | Ensure right access to TermSrvLicensing reg keys | License Server | Can't access required registry entry, error code %1!x!. |
| LS1 | 3221291029 | Stopped | Failed | | Verify enough memory | Resource crunch | Can't allocate required memory. |
| LS5 | 3355443215 | Running | Running | | Client trying to steal license | TS Client | Policy module for product %1!s!, company %2!s! returned unexpected data, request has been |
| LS7 | 3222339608 | Non-activated | Activated | | Check ACLs on TermServLicensing reg keys | License Server | Unable to backup server's certificate, server might need to be re-registered if primary copy is corrupt. |
| LS3 | 3222274052 | Running | Stopped | | Unable to restore the saved database | License Server | possible corrupted database |
| LS1 | 3222798341 | Stopped | Failed | | ACLs on the registry where Jet tries | License Server | Can't create ESE database file %1!s! - error %2!d! %3!s!. |

FIG. 5

602 — Event Group: LS2
1. TLS_I_SERVICE_START *
2. TLS_E_DBRESTORE_MOVEFILE
3. TLS_E_INCOMPATIBLEDATABSE
4. TLS_E_RESTOREDBFILE_OPENFAIL
5. TLS_E_RESTOREDBFILE_OPENFAIL_SAVED
6. TLS_I_OPENRESTOREDBFILE
7. TLS_I_RENAME_DBFILE
8. TLS_I_USE_DBRESTOREFILE
9. TLS_W_BACKUPCERTIFICATE
10. TLS_W_CORRUPTTRYBACKUPCERTIFICATE
11. TLS_W_DBRESTORE_SAVEEXISTING
12. TLS_W_STARTUPCORRUPTEDCERT
13. TLS_W_STARTUPNOCERT
14. TLS_E_SERVICE_WSASTARTUP
15. TLS_I_SERVICE_CONTINUE 604 — Event Group: LS3
1. TLS_I_SERVICE_STOP
2. TLS_E_CORRUPT_DATABASE 606 — Event Group: LS4
1. TLS_I_SERVICE_PAUSED 608 — Event Group: LS7
1. TLS_W_BACKUPCERTIFICATE 610 — Event Group: LS8
1. TLS_E_LOAD_CERTIFICATE

SYSTEM AND METHOD FOR PROVIDING A HEALTH MODEL FOR SOFTWARE

FIELD OF THE INVENTION

The invention relates generally to computer systems, and more particularly to an improved system and method for providing a health model of software or software services.

BACKGROUND OF THE INVENTION

Existing software management and administration products are designed to report isolated events during execution of software and may also report information of operational status of software, but often do so without providing any context. For instance, an error message may be generated for a log file that may report a failure such as a failure to open a file. This error message may not provide any context regarding the severity of this failure. The error may represent a minor failure or it may represent a major failure that places the software in a failed state of operation. There needs to be a way to understand the context of the operational status of executing software when such errors are reported so that a system administrator may appreciate the impact of such an error. In an attempt to provide more context, selected errors or status messages have been reported in a single view or monitoring window but this approach has not relieved the system administrator of the burden to make sense of the error or status messages, nor has it provided the system administrator with a satisfactory appreciation of the impact of the errors. There has been insufficient progress in improving the ability to monitor the health of software using this approach.

Following the approach of model-based testing does not appear to be any more promising. Model-based testing is a current practice for testing software whereby a model of an application is first created using the same requirements used for creating the software, and then test cases are generated and executed by both the application under test and by the model. The results of the tests executed by the application are verified against the results of the tests executed by the model. When discrepancies between the application and the model are detected, the test program alerts the tester. Although model-based testing may provide a framework for generating various combinations of input to the application, the model is only as good as its fit for the application. Taking such an approach for building a health model for monitoring the execution of software has several problems. Inherently, every model is imperfect to the extent that it does not accurately represent the application. However, in the case of model-based testing, the model will not fit the software application to the extent that the requirements are interpreted differently by the software developers who create the software and the modelers who build the model for testing. As a consequence, behavior of the application program may not be accurately reflected by a model constructed in such a manner. Furthermore, attempts to monitor the execution of a software application using such a flawed model will result in frustration due to inaccuracies in the state of execution of the software.

What is needed is a way for constructing a health model that will accurately reflect the state of operation of software or software services. Any such health model should allow a system administrator who may only be interested in monitoring a specific functionality of the product, like a network connection or database availability, to focus on monitoring that functionality.

SUMMARY OF THE INVENTION

Briefly, the present invention provides an improved system and method for providing a health model of software or software services. To this end, a health model builder is provided that may construct a health model from instrumentation. Any type of instrumentation may be used for constructing the model, such as performance counters, events, error messages and other indicators of operational status. The health model builder may include an instrumentation collector for collecting instrumentation of the software or software service, an instrumentation analyzer for mapping and grouping the instrumentation to states of operation of the software component, and a health model generator for creating a health model using the states of operation and the groups of mapped instrumentation.

The present invention additionally provides a method for building a health model. First, the instrumentation of the software component may be mapped to states of operation of the software component. For each one of the instrumentation, the state of operation of the software component may be determined before that instrumentation is generated and the state of operation of the software component may also be determined after the instrumentation is generated. Then, the instrumentation may be grouped together if the instrumentation has the same state of operation of the software component before the instrumentation is generated and also has the same state of operation after the instrumentation is generated. A health model may be built with the states of operation resulting from mapping the instrumentation to states of operation of the software component and with transitions between the states of the health model that represent an occurrence of instrumentation in an instrumentation group.

Advantageously, the system and method may transform what can appear to be an incomprehensible number and variety of instrumentation into a readily comprehensible health model for monitoring and managing software or a software service. In addition to providing a system and method for building a health model, the present invention allows for identification of anti-alert instrumentation to be added to the software or software services. An anti-alert is particularly useful where instrumentation is missing for reporting recovery from failure so that the health model may more accurately reflect the state of operation of the software or software services. Moreover, a blame component may be identified for any instrumentation of a software component that indicates it failed because of another software component. The blame component may be part of a chain of components pointing to the root cause component for a state of failure and, thus, may allow a system administrator to determine what system was responsible for the failure.

Other advantages will become apparent from the following detailed description when taken in conjunction with the drawings, in which:

DETAILED DESCRIPTION

Exemplary Operating Environment

Figure 1:
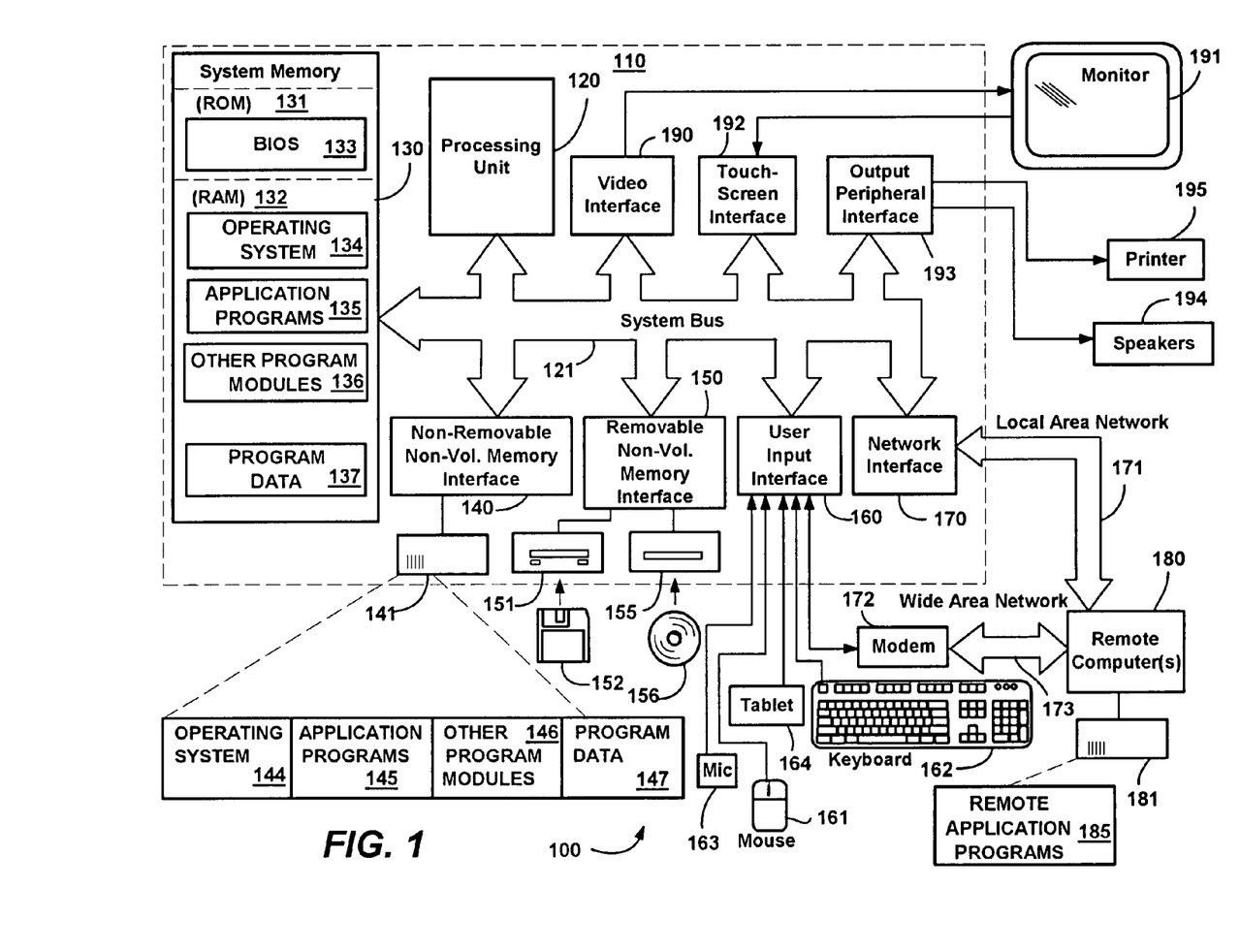
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Building a Health Model

The present invention is generally directed towards a method and system for providing a health model of software or software services from instrumentation. As used herein, instrumentation means any instrumentation for management of the software or software service such as performance counters, events, error messages, and other indicators of operational status. For instance, a monitoring tool may monitor page faults as an indicator of operational status. As will be seen, the invention provides a health model builder and a method for mapping the instrumentation of the software component to states of operation of the software component. The instrumentation may then be grouped together and a health model may be built with the states of operation resulting from mapping the instrumentation to states of operation of the software component and with transitions between the states of the health model that represent an occurrence of instrumentation in an instrumentation group. As will be understood, the various block diagrams, flow charts and scenarios described herein are only examples, and there are many other scenarios to which the present invention will apply.

Figure 2:
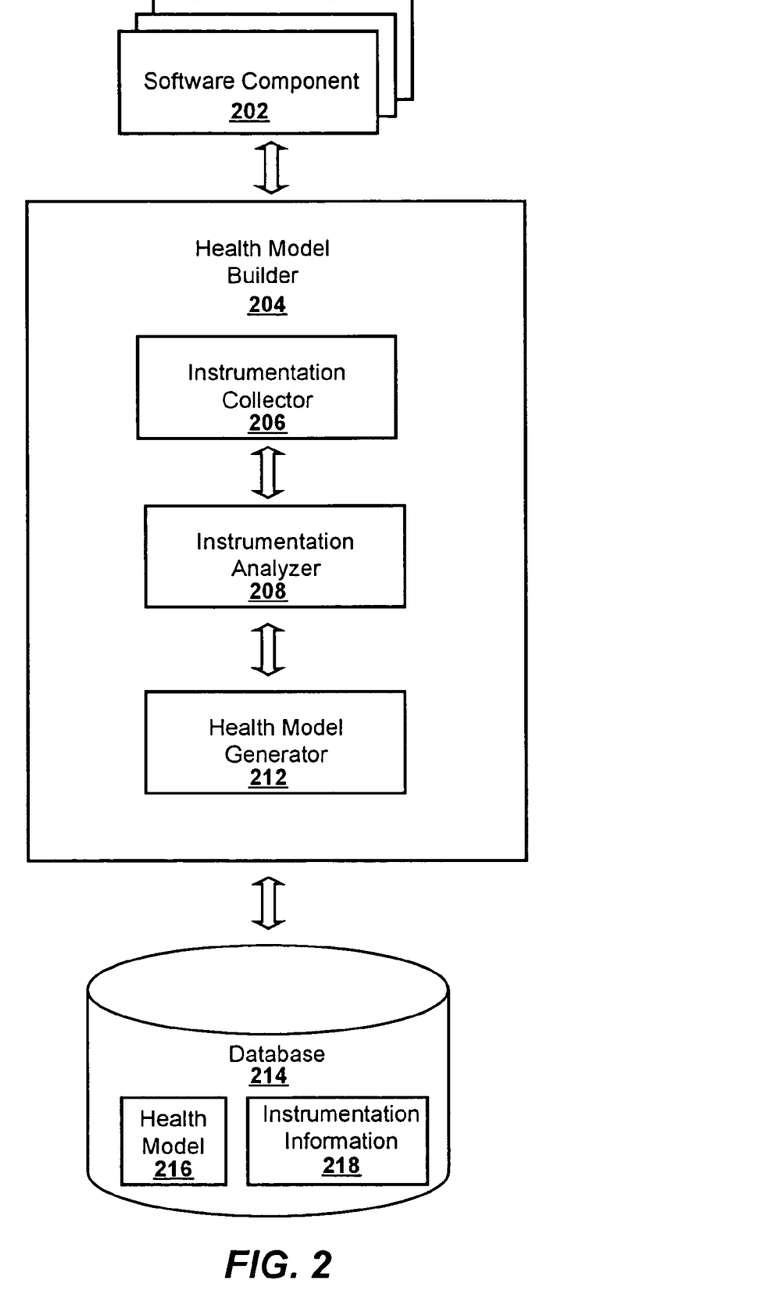
FIG. 2 is a block diagram generally representing an exemplary architecture of system components for building a health model of software or software services, in accordance with an aspect of the present invention.

Turning to FIG. 2 of the drawings, there is shown a block diagram generally representing an exemplary architecture of system components for building a health model of software or software services. Those skilled in the art will appreciate that the functionality implemented within the blocks illustrated in the diagram may be implemented as separate components or the functionality of several or all of the blocks may be implemented within a single component. For example, the functionality of the instrumentation analyzer 208 may be included in the health model generator 212. Or the functionality for the instrumentation collector component 206 of the health model builder 204 may be implemented as a separate component.

A health model may be built for any software component 202 or software service that may be instrumented. The software component 202 may be any type of executable software code such as a kernel component, an application program, a linked library, and so forth. The health model builder 204 may build a health model using instrumentation information of the software component or software service. The health model builder 204 may include an instrumentation collector 206, an instrumentation analyzer 208, and a health model generator 212. The instrumentation collector 206, the instrumentation analyzer 208, and the health model generator 212 may be any type of executable software code such as a kernel component, an application program, a linked library, and so forth.

In specific, the instrumentation collector 206 may collect instrumentation of a software component 202 or service. The instrumentation may include any instrumentation for management of the software or service such as performance counters, events, error messages, and other indicators of operational status. In one embodiment, the instrumentation collector 206 may be a spreadsheet application program that stores information about instrumentation that may be manually or automatically collected and entered into a spreadsheet. In another embodiment, the instrumentation collector 206 may be a parser for automatically parsing a software component or service to extract and store information about instrumentation of the software component or service. In yet another embodiment, the instrumentation collector 206 may receive information about instrumentation stored in a document or database.

The instrumentation analyzer 208 may analyze instrumentation of a software component 202 or service, may map the instrumentation to states of operation of the software component, and may group instrumentation that result in the same transition from one state of operation of the software component to another state of operation of the software component. In one embodiment, the states of operation may be previously defined and included in the information about instrumentation collected by the instrumentation collector 206. In this embodiment, the instrumentation may be automatically mapped to the previously defined states of operation. In another embodiment, the states of operation may be defined by the instrumentation analyzer using predefined states of operation and the instrumentation may be manually or automatically mapped to the predefined states of operation. In yet another embodiment, the states of operation may be manually defined and the instrumentation may be manually mapped to the defined states of operation.

In any of these embodiments, the instrumentation analyzer 208 may map a single individual instrumentation to a state of the operation of the software component before that instrumentation is generated and may also map that instrumentation to the state of operation after that instrumentation is generated. The instrumentation analyzer may then group the mapped instrumentation into groups that have the same state of operation before that instrumentation was generated and the same state of operation after that instrumentation is generated. In one embodiment, the instrumentation analyzer 208 may be an application, such as a spreadsheet application, that may group the instrumentation by filtering the instrumentation based upon the state of the operation of the software component before instrumentation was generated and the state of operation after the instrumentation was generated.

The health model generator 212 may create a health model 216 using the states of operation of the software component and the groups of mapped instrumentation. In one embodiment, the health model generator 212 may be an application that may generate a state diagram using the states of the software component as the states of the health model. In this embodiment, the transitions from each state of the health model may be based upon the groups of mapped instrumentation where a transition represents the generation of instrumentation in an instrumentation group. Once the health model 216 is built, it may be stored, along with the instrumentation information used to generate it, in a database 214 operably coupled to the health model builder 204.

Figure 3:
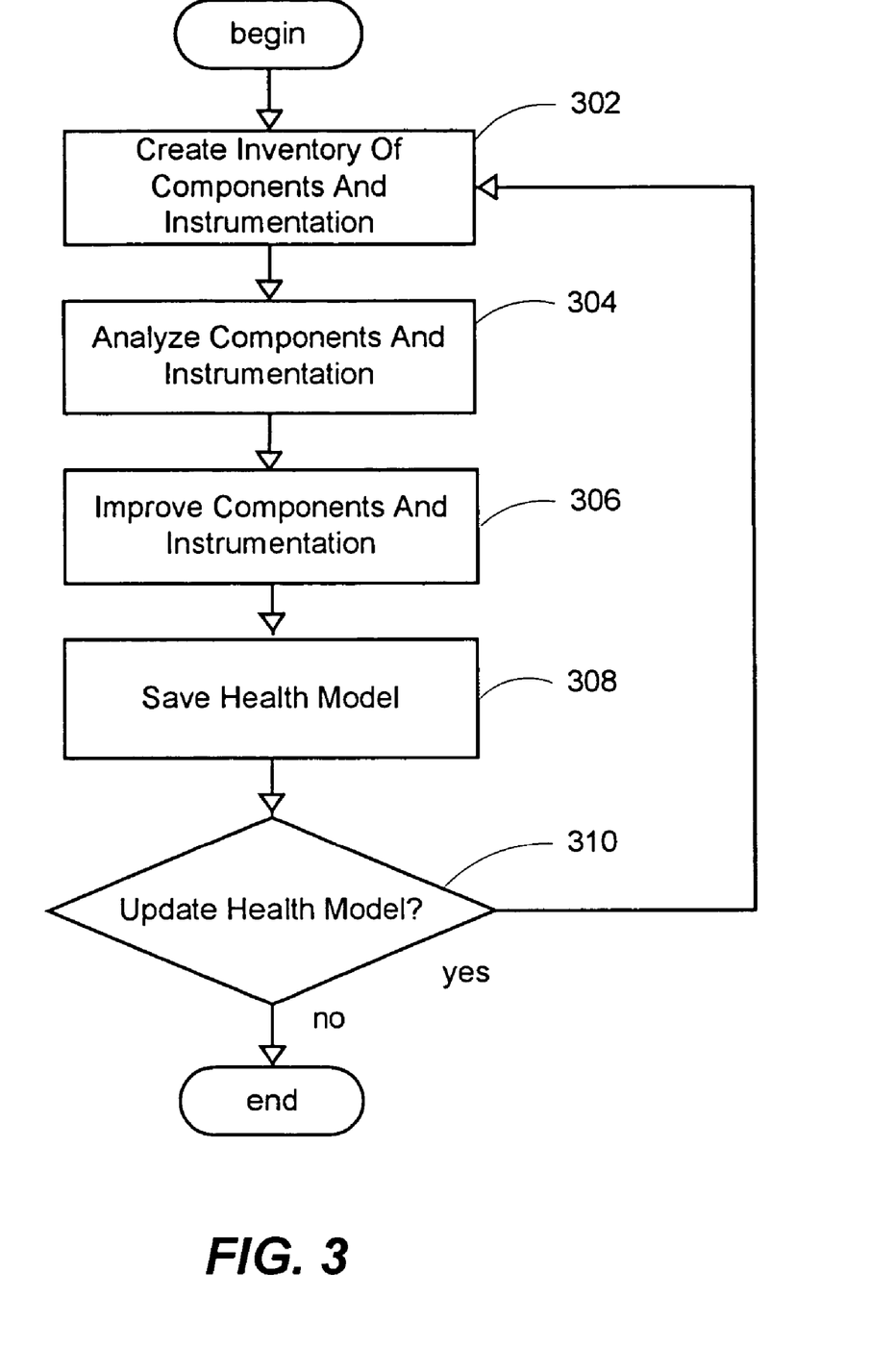
FIG. 3 is a flowchart generally representing the steps undertaken for building a health model of software services or components, in accordance with an aspect of the present invention.

FIG. 3 presents a flowchart generally representing the steps undertaken for building a health model of software or software services from instrumentation. At step 302, an inventory of any components or services of the software and any existing instrumentation of the components or services may be created. The inventory may be a partial or complete inventory of instrumentation for any component or service. The instrumentation may include any instrumentation for management of the software or service such as performance counters, events, error messages, and other indicators of operational status. For instance, a monitoring tool may monitor page faults as an indicator of operational status. Along with the inventory of components, there may be available an architecture diagram that may indicate internal and external dependencies and any failure points associated with the components of the software or services. Next, the components or services of the software and any existing instrumentation of the components or services may be analyzed at step 304 for determining the states of operation of software component for use in constructing the health model and mapping the instrumentation to the states of the health model. Once the components and existing instrumentation have been analyzed and mapped to states of the health model, then the components and existing instrumentation may be improved at step 306. For example, the software may be modified to eliminate a point of failure or new instrumentation may be added to reflect a recovery from failure. After the components and instrumentation may have been improved, the health model of the software or service may be saved at step 308. Additionally, verification, diagnosis, and recovery may be planned. The saved health model may be verified by applying the steps of the verification plan. The software or service may then be operational and monitored. If the software is upgraded or new failures are discovered during operation, then a determination may be made at step 310 to update the health model by returning to step 302 to repeat the process. Otherwise, the process of building a health model is finished. If the software is later updated, then the health model may also be updated following the steps of FIG. 3 to reflect any changes in operation of the software.

Figure 4:
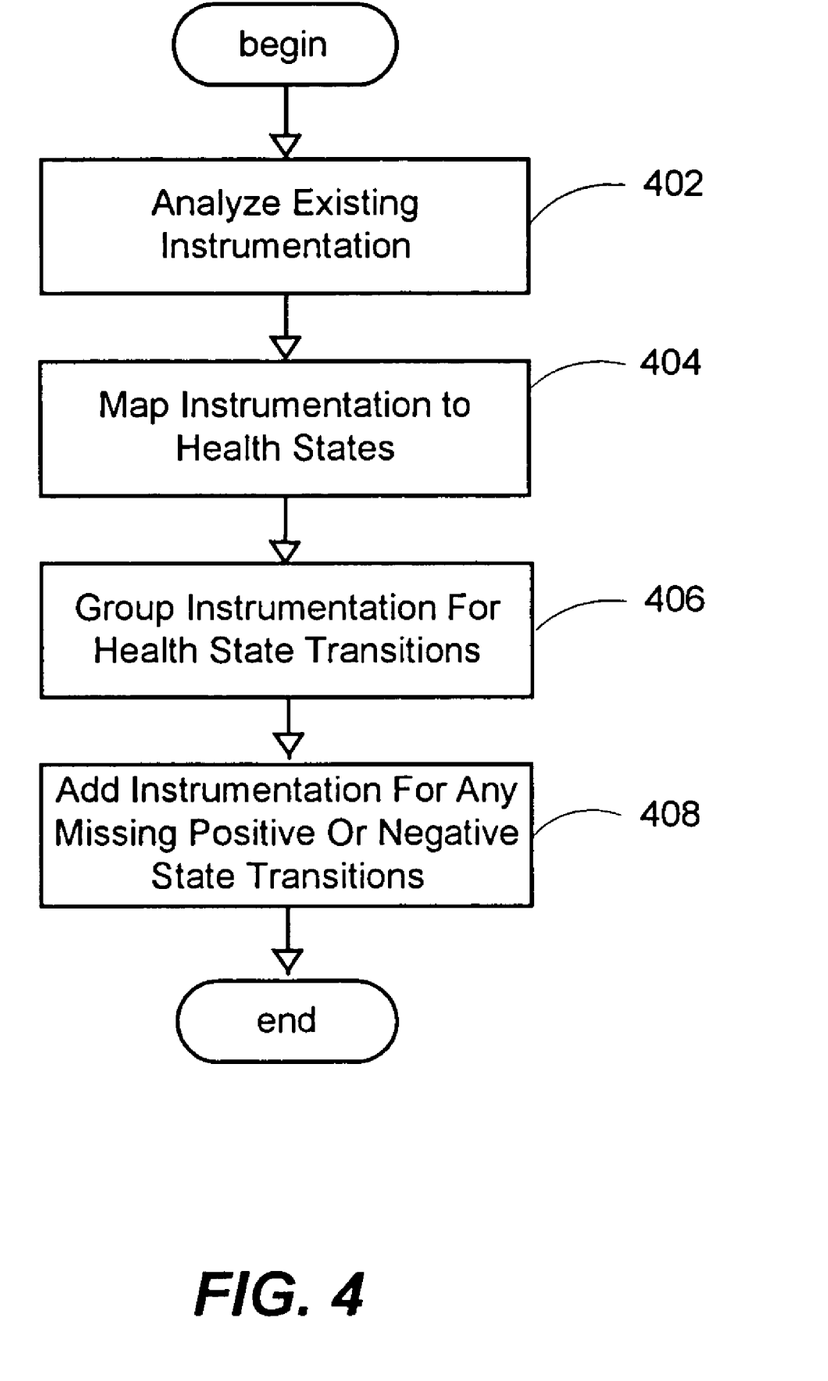
FIG. 4 is a flowchart generally representing the steps undertaken for analyzing components and instrumentation in building a health model of software services or components, in accordance with an aspect of the present invention.

FIG. 4 presents a flowchart generally representing the steps undertaken for analyzing components and instrumentation in building a health model of software services or components. At step 402, any existing instrumentation may be analyzed for determining the states of operation of software component for use in constructing the health model. In one embodiment, the states of operation may be individually defined for a software component beforehand. In another embodiment, standardized states of operation may be generally used for the health model. After analyzing the information, the instrumentation may be manually or automatically mapped to health states at step 404. In these exemplary embodiments, each instrumentation may be mapped to a state of the operation of the software component before that instrumentation is generated and may also be mapped to the state of operation after that instrumentation is generated. At step 406 instrumentation groups may be consolidated around health state transitions. The instrumentation may be grouped together if the instrumentation has the same state of operation before the instrumentation was generated and the same state of operation after that instrumentation is generated. Thus, groups of instrumentation may be consolidated for representing the transition from one state of a health model to another state of a health model.

At step 408, instrumentation may be added for any missing positive or negative state transitions. Where instrumentation of a software component exists only for part of a cycle of operation, such as instrumentation only for a failure resulting in a failed state of operation, a health model built using such existing instrumentation would be missing corresponding instrumentation that reflected the proper state of operation when the software component recovered. Therefore, additional instrumentation may be added at step 408 to reflect recovery back to a running state. After any missing positive or negative instrumentation is added, then the process is finished.

Figure 5:
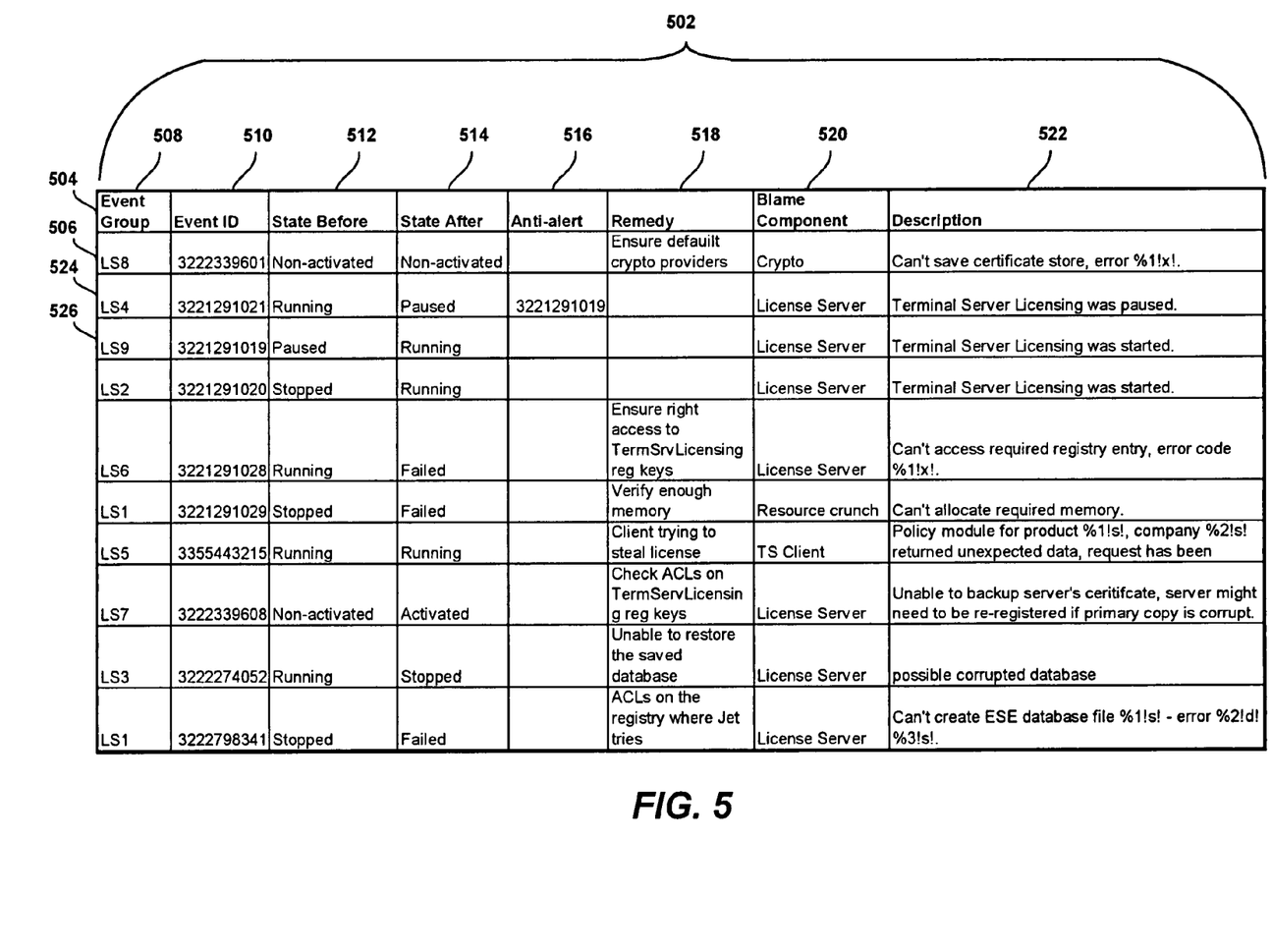
FIG. 5 is an illustration generally representing an example of information collected from software components or services and information collected from instrumentation of the software components or services that may be used for building a health model, in accordance with an aspect of the present invention.

FIG. 5 presents an illustration generally representing an example of information collected from software components or services and information collected from instrumentation of the software components or services that may be used for building a health model. The information may be represented in a table 502 that may include a header 504 with a description of each field of information and records such as record 506 with information collected from an instance of instrumentation of a software component or service. The header 504 may include an event group 508, an event identification 510, the state before the event occurs 512, the state after the event occurs 514, an anti-alert 516 that may occur to transition the state of operation back to resume the state prior to the occurrence of the event, a remedy 518 for restoring the component or service to a desired state, a blame component 520 which may be part of a chain of components pointing to the root cause component for a state of failure, and a description 522 of the event.

Each record may include information about one instance of instrumentation of the software component. For example, record 506 includes information about an event. This event indicates a failure to save a certificate as part of initialization of the License Server component. As a result, the License Server component remains in an inactive state of operation due to this failure during initialization of the component. This is reflected by the fact that the state before the occurrence of the event and the state after the occurrence of the event are both non-activated. There is a remedy indicated for recovery by verifying that the default cryptography provider used by the License Server may save a certificate. Additionally, there is a blame component indicated for the failure, namely, the cryptography component.

The blame component may be another software component, upon which the first component depends, that is responsible for a failure indicated by instrumentation such as an event or error message. A blame component, in turn, may itself have a failure indicated by instrumentation that was the cause for the failure of the first component that depended upon it. The record for the instrumentation indicating the failure of the blame component may list another blame component responsible for its failure. In fact, there may be a chain of blame components that ultimately point to the root cause component for a state of failure of the initial component.

Advantageously, the blame component makes it easy to develop a health model. It allows the health model to be created in a distributed fashion and allows for building a health model of a distributed system with many components. It also may provide information to a system administrator to make decisions about recovery if a component depended upon fails. For example, a system administrator may be able to recover from a file system failure for writing to a specific location by writing to an alternate location. In this case, the component may recover without the need to discover the root cause of the failure to write to the file system, such as insufficient disk space or a security access failure. Furthermore, for a system that may depend upon another system, there may be situations where there is insufficient context for a system administrator to determine what to do for recovery where the failure occurred in the other system. The blame component may allow a system administrator to determine what system was responsible for the failure and allow the system administrator to hand off the failure to the system administrator of another system responsible for the failure to determine what to do for recovery.

Turning again to FIG. 5, record 524 shows information about an event and indicates that there is an anti-alert corresponding to this event. An anti-alert of a given instrumentation means herein any other instrumentation that indicates the occurrence of an activity that restores the component back to its desired state of operation before the given instrumentation was generated. In the case of record 524, the instrumentation is an event and the anti-alert is another event specified by the information in record 526. Record 524 indicates a pause event occurred that placed the Licensing Server in a paused state of operation. The anti-alert for this event indicated in record 524 is the event identification for record 526 which indicates a running event occurred that would place the Licensing Server back into a running state of operation.

The anti-alert advantageously allows instrumentation to capture a cycle of change in states of operation, such as a cycle of failure and recovery. The failure may result in a failed state of operation and the recovery may return the system back to a running state. Where instrumentation of a software component exists only for part of a cycle of operation, such as instrumentation only for a failure resulting in a failed state of operation, a health model built using such existing instrumentation would be missing corresponding instrumentation that reflected the proper state of operation when the software component recovered. Therefore, additional instrumentation may be added, such as an anti-alert in this case, to reflect recovery back to a running state. This may allow automatic monitoring of a software system or service. For instance, when a monitoring system receives notification of a complete cycle of an alert and an anti-alert for a temporary failure, the monitoring system may automatically suppress notification around such a temporary failure in an otherwise normal system.

Several states of operation of the software component are also shown in FIG. 5 underneath the state before 512 and state after 514 columns. The states of operation shown are running, failed, stopped, paused, non-activated, and activated. These states of operation may be used to construct the states of a health model for the Licensing Server component. Additionally shown are several different event groups underneath the event group 508 column. Any instrumentation that has the same state before 512 and the same state after 514 may be grouped together so that an instrumentation group may be formed that represents a single transition from that state before to that state after. Thus, groups of events may be consolidated for representing the transition from one state of a health model to another state of a health model. Each event group in FIG. 5 may represent a single transition from one of the states of operation to another state of operation of the software component.

Those skilled in the art will appreciate that FIG. 5 presents events as an example of instrumentation and that the information about instrumentation may include information other than that shown in FIG. 5. For example, the information may include performance counters, the symbolic name of the instrumentation, the instrumentation identification, the severity level, the desired state when the instrumentation occurs, the security state, and so forth.

Figure 6:
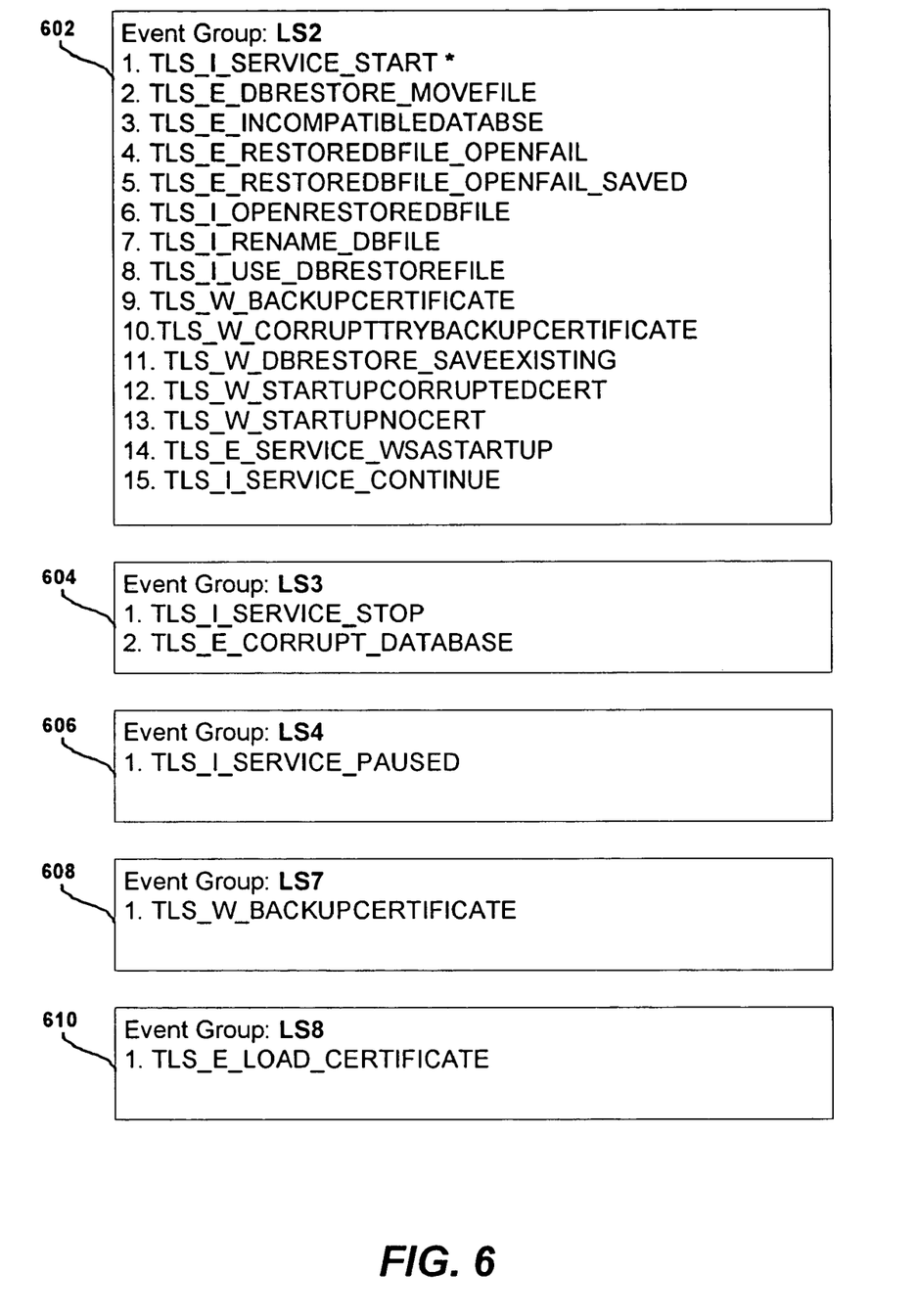
FIG. 6 is an exemplary illustration generally representing groups of events that may be consolidated for representing the transition from one state of a health model to another state of a health model, in accordance with an aspect of the present invention.

FIG. 6 presents an illustration generally representing groups of events that may be consolidated for representing the transition from one state of a health model to another state of a health model. The inventory of instrumentation may be filtered based upon the state of operation before the instrumentation was generated and the state of operation after the instrumentation was generated. FIG. 6 shows six instrumentation groups that result from filtering the inventory of instrumentation for the Licensing Server component in such a manner. Event group LS2 602 represents the consolidation of fifteen events that result in a transition from a stopped state of operation to a running state of operation. Event group LS3 604 represents the consolidation of two events that result in a transition of the state of operation from a running state to a stopped state. Event group LS4 606 represents a single event that results in a transition of the state of operation from a running state to a paused state. Note that an instrumentation group may only include a single instrumentation. Event group LS7 608 represents a single event that results in a transition of the state of operation from a non-activated state to an activated state. And event group LS8 610 represents a single event that results in a transition of the state of operation from a non-activated state to an activated state.

Figure 7:
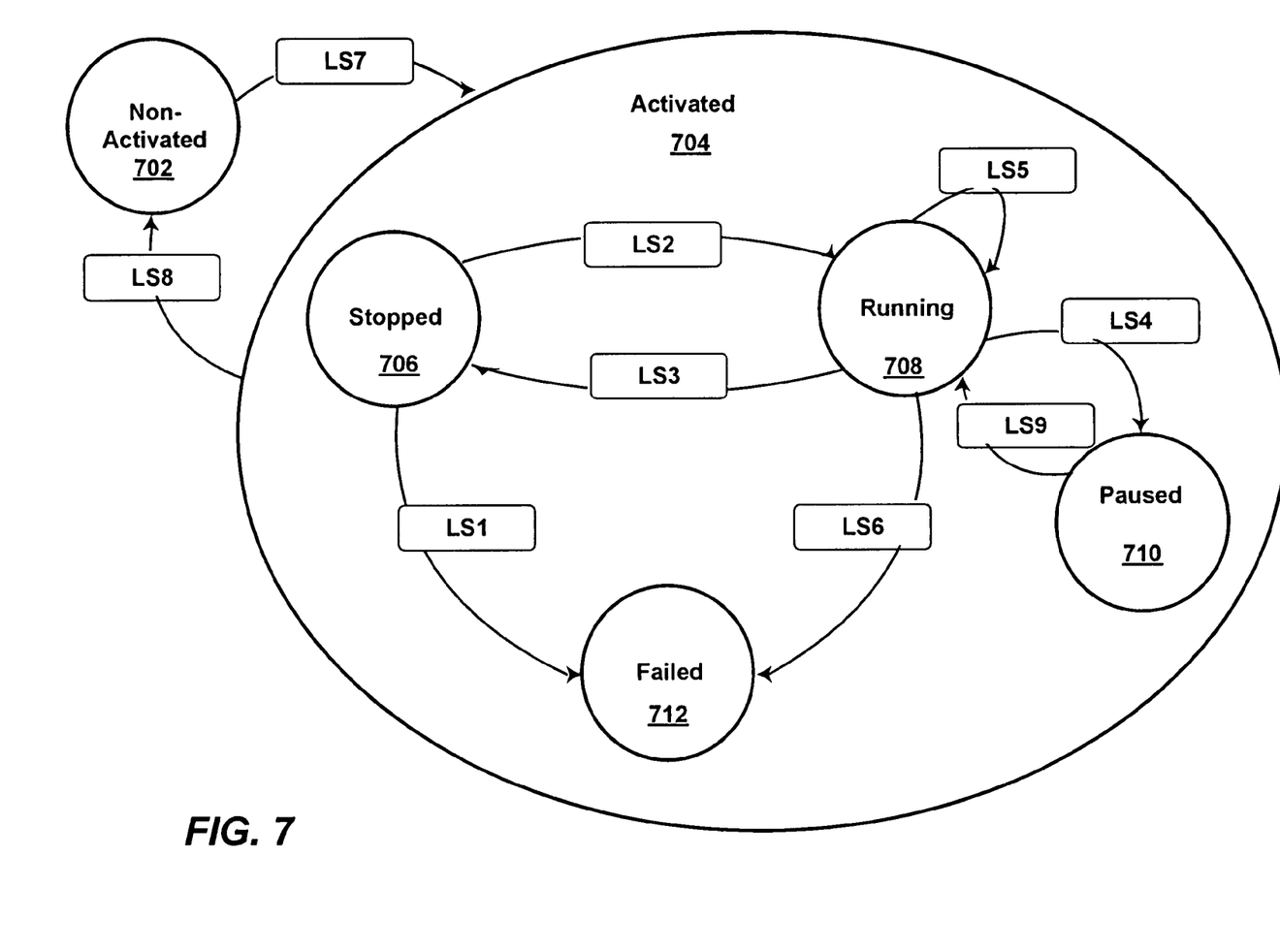
FIG. 7 is a state diagram generally representing the states of an example of a health model for a component of a software services and the transitions between each state of the example of a health model, in accordance with an aspect of the present invention.

FIG. 7 presents a state diagram generally representing the states of an example of a health model for a component of a software service and the transitions between each state of the example of a health model. More particularly, the state diagram illustrates six states of operation for the health model corresponding to the six states of operation of the Licensing Server component appearing in FIG. 5. The state diagram also shows the instrumentation groups associated with the transition between the states. The Licensing Server component is in Non-activated state 702 until the Licensing Server component is authenticated. Upon generation of instrumentation belonging to the LS7 instrumentation group that may indicate authentication of a certificate, the Licensing Server component transitions from the Non-activated state 702 to the Activated state 704. If the authentication of the certificate is unsuccessful as signified by generation of instrumentation belonging to the LS8 instrumentation group, the Licensing Server component may transition back to the Non-activated state 702. Once the Licensing Server component is activated, the Licensing Server component may be in Stopped state 706 until generation of instrumentation belonging to LS2 instrumentation group indicating the Licensing Server component is in a running state of operation. The Licensing Server component then transitions to Running state 708. The Licensing Server component stays in the Running state 708 whenever instrumentation belonging to LS5 instrumentation group is generated.

The Licensing Server component may transition from the Running state 708 to either the Paused state 710, the Failed state 712 or to the Stopped state 706. Generation of instrumentation belonging to the LS4 instrumentation group indicating the License Server component is in a paused state of operation may transition the Licensing Server component to the Paused state 710. Generation of the anti-alert instrumentation belonging to the LS9 instrumentation group may transition the Licensing Server component back to the Running state 708. The Licensing Server component may also transition from the Running state 708 to the Failed state 712 whenever instrumentation group LS6 is generated that indicates the License Server component has failed, but note that a corresponding instrumentation group is missing for indicating that the Licensing Server component may transition from the Failed state 712 back to the Running state 708. Instrumentation, such as an anti-alert, may be added where there is none to indicate an occurrence of a transition from a failed state of operation to a running state of operation of the License Server component. A new instrumentation group including this instrumentation may be created and added to the health model for indicating a transition from Failed state 712 to Running state 708. By adding such an anti-alert and updating the health model, the health model may accurately reflect the state of the License Server component when it transitions from a failed state to a running state. Similarly, the Licensing Server component may transition from Stopped state 706 to Failed state 712 when instrumentation is generated that belongs to instrumentation group LS1, but there does not exist any instrumentation group for reflecting a transition from the Failed state 712 back to Stopped state 706. Again, an anti-alert may be added and the health model may be updated so it accurately reflects the state of operation of the License Server component.

In addition to providing a system and method for building a health model, the present invention allows for identifying missing instrumentation, such as for reporting recovery from failure, and allows for adding instrumentation so that the health model may more accurately reflect the state of operation of the software or software services. Moreover, a blame component may be identified for any instrumentation of a software component that indicates it failed because of another software component. The blame component may be part of a chain of components pointing to the root cause component for a state of failure and, thus, may allow a system administrator to determine what system was responsible for the failure. In a distributed system, the blame component allows a system administrator to hand off the failure to the system administrator of another system responsible for the failure to determine what to do for recovery.

As can be seen from the foregoing detailed description, the present invention provides an improved system and method for building a health model from instrumentation of software. Once so constructed, the health model may be updated as the software changes or as new behaviors are identified in need of monitoring. Furthermore, the system and method provided are flexible and extensible. A health model may be constructed using any type of instrumentation and may be created in a distributed fashion with many components. The system and method may be advantageously used for building a health model for complex software that may have been developed by many individuals and, perhaps, over a long period of time. By piecing together the analytical data from individuals who have worked on different parts of the system, a health model of the entire system may be built without the need for a system architect or other kind of expert required to know the details of the entire system. As is now understood, the present invention may advantageously transform what can appear to be an incomprehensible number and variety of instrumentation into a readily comprehensible health model for monitoring and managing software or a software service. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for building a health model of software components, comprising one or more computer processors, system memory, and one or more physical computer-readable media having stored thereon computer-executable instructions which, when executed, perform a method comprising:
  creating an inventory of instrumentation of the software components:
  mapping each individual instrumentation in the inventory of instrumentation to a state of operation of the software components before the instrumentation is generated, the state of operation before the instrumentation is generated being from a list comprising running, failed, stopped, paused, non-activated, and activated;
  mapping each individual instrumentation in the inventory of instrumentation to a state of operation of the software components after the instrumentation is generated, the state of operation before the instrumentation is generated being from a list comprising running, failed, stopped, paused, non-activated, and activated;
  analyzing the inventory to identify instrumentation that result in the same transition from one state of operation of the software components to another state of operation of the software components;
  grouping the identified instrumentation that result in the same transition from one state of operation of the software components to another state of operation of the software components by filtering the instrumentation based upon the state of the operation of the software component before instrumentation was generated and the state of operation after the instrumentation was generated;

generating the health model using the states of operation and at least one transition representing a group of instrumentation from one state of operation of the software components to another state of operation of the software components; and representing the health model in a table comprising fields including an event group, an event identification, the state before an event occurs, the state after an event occurs, an anti-alert, a remedy, a blame component, and a description.

2. The system of claim 1 further comprising a database for storing the information about the instrumentation of the software components.

3. The system of claim 1 further comprising a database for storing the health model.

4. The system of claim 3 wherein the database also stores the instrumentation information used to generate the health model.

5. The system of claim 1 wherein the health model comprises a state diagram with a transition from one state to another state for a group of instrumentation.

6. The system of claim 1 wherein the instrumentation collector comprises a spreadsheet for manual entry of information about instrumentation of software components.

7. The system of claim 1 wherein the creating an inventory comprises a parser automatically parsing a software component to extract information about instrumentation of the software component.

8. The system of claim 1 wherein generating the health model comprises an application that generating a state diagram.

9. The system of claim 1 wherein the computer-executable instructions comprise a plurality of modules.

10. A method for building a health model of a software component, comprising the steps of:
  creating an inventory of instrumentation of the software component;
  mapping each individual instrumentation in the inventory of instrumentation to a state of operation of the software component before the instrumentation is generated, the state of operation before the instrumentation is generated being from a list comprising running, failed, stopped, paused, non-activated, and activated;
  mapping each individual instrumentation in the inventory of instrumentation to a state of operation of the software component after the instrumentation is generated, the state of operation before the instrumentation is generated being from a list comprising running, failed, stopped, paused, non-activated, and activated;
  analyzing the inventory to identify instrumentation that result in the same transition from one state of operation of the software component to another state of operation of the software component;
  grouping the identified instrumentation that result in the same transition from one state of operation of the software component to another state of operation of the software component by filtering the instrumentation based upon the state of the operation of the software component before instrumentation was generated and the state of operation after the instrumentation was generated;
  generating the health model using the states of operation and at least one transition representing a group of instrumentation from one state of operation of the software component to another state of operation of the software; and
  representing the health model in a table comprising fields including an event group, an event identification, the state before an event occurs, the state after an event occurs, an anti-alert, a remedy, a blame component, and a description.

11. The method of claim 10 wherein the step of creating an inventory of instrumentation of the software component comprises parsing the software component to extract information about instrumentation of the software component.

12. The method of claim 10 further comprising the step of determining states of operation of the software component.

13. The method of claim 12 wherein the step of determining states of operation of the software component comprises determining a stopped state.

14. The method of claim 12 wherein the step of determining states of operation of the software component comprises determining a running state.

15. The method of claim 12 wherein the step of determining states of operation of the software component comprises determining a failed state.

16. The method of claim 10 further comprising the step of adding instrumentation where there is none to indicate an occurrence of a transition from a failed state of operation to a running state of operation.

17. The method of claim 10 further comprising the step of adding instrumentation where there is none to indicate an occurrence of a transition from a running state of operation to a failed state of operation.

18. The method of claim 10 further comprising the step of persistently storing the inventory of instrumentation.

19. The method of claim 10 further comprising the step of persistently storing the generated health model.

20. The method of claim 10 further comprising revising the instrumentation of the software component.

21. The method of claim 20 further comprising updating the health model using the revised instrumentation.

22. The method of claim 21 further comprising generating a new health model.

23. The method of claim 10 wherein the step of receiving an inventory of instrumentation comprises receiving an inventory of one or more events.

24. The method of claim 10 wherein the step of receiving an inventory of instrumentation comprises receiving an inventory of one or more performance counters.

25. The method of claim 10 wherein the step of receiving an inventory of instrumentation comprises receiving an inventory of one or more error messages.

26. The method of claim 25 wherein the step of generating a state diagram comprises using an application to generate the state diagram.

27. The method of claim 10 wherein the step of receiving an inventory of instrumentation comprises parsing the software component to extract information about instrumentation of the software component.

28. The method of claim 10 wherein the step of receiving an inventory of instrumentation comprises manually entering instrumentation information in a spreadsheet application.

29. The method of claim 10 wherein the step of analyzing the inventory comprises determining the state of operation before an instrumentation event occurs and the state of operation after the instrumentation event occurs.

30. The method of claim 10 further comprising storing the health model and the instrumentation used to generate the health model in a database.

31. The method of claim 10 wherein the step of analyzing the inventory to group instrumentation that result in the same transition from one state of operation of the software component to another state of operation of the software component comprises labeling each group of instrumentation as a single transition action from one state of operation of the software component to another state of operation of the software component.

32. The method of claim 10 wherein the step of analyzing the inventory to group instrumentation that result in the same transition from one state of operation of the software component to another state of operation of the software component comprises using an application to analyze the inventory to group instrumentation that result in the same transition from one state of operation of the software component to another state of operation of the software component.

33. The method of claim 10 wherein the step of analyzing the inventory comprises determining a component to blame for instrumentation indicating a failure of the software component.

34. The method of claim 10 wherein the step of generating the health model comprises generating a state diagram.

35. The method of claim 10, wherein the health model is configured to detect cycles of change in states of operation.

36. The method of claim 35, wherein at least one of the cycles of change in states of operation comprises a cycle of failure and recovery.

37. A computer storage medium having computer-executable instructions for performing the method of claim 10.

* * * * *

UNITED STATES PATENT AND TRADEMARK OFFICE
CERTIFICATE OF CORRECTION

| | | |
|---|---|---|
| PATENT NO. | : 7,398,511 B2 | Page 1 of 1 |
| APPLICATION NO. | : 10/734016 | |
| DATED | : July 8, 2008 | |
| INVENTOR(S) | : Ahmed El-Shimi et al. | |

It is certified that error appears in the above-identified patent and that said Letters Patent is hereby corrected as shown below:

In column 12, line 48, in Claim 1, delete "components:" and insert -- components; --, therefor.

In column 14, line 4, in Claim 10, delete "software;" and insert -- software component; --, therefor.

Signed and Sealed this

Nineteenth Day of April, 2011

David J. Kappos
*Director of the United States Patent and Trademark Office*